(12) United States Patent
Waffenschmidt

(10) Patent No.: US 6,943,544 B2
(45) Date of Patent: Sep. 13, 2005

(54) ADJUSTMENT OF A MAGNETO-RESISTIVE ANGLE SENSOR

(75) Inventor: Eberhard Waffenschmidt, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/179,324

(22) Filed: Jun. 25, 2002

(65) Prior Publication Data

US 2003/0042894 A1 Mar. 6, 2003

(30) Foreign Application Priority Data

Jun. 27, 2001 (DE) ......................................... 101 30 988

(51) Int. Cl.⁷ ........................... G01R 35/00; G01B 7/30
(52) U.S. Cl. ............................ 324/207.21; 324/207.12; 324/207.25
(58) Field of Search ........................... 324/202, 207.12, 324/207.2, 207.21, 207.25, 252

(56) References Cited

U.S. PATENT DOCUMENTS

| | | | | |
|---|---|---|---|---|
| 4,464,935 A | * | 8/1984 | McHugh ...................... | 73/660 |
| 5,612,906 A | * | 3/1997 | Gotz ............................ | 702/94 |
| 6,104,187 A | * | 8/2000 | Marx et al. ............. | 324/207.21 |
| 6,173,501 B1 | | 1/2001 | Blank et al. .................... | 33/356 |
| 6,304,074 B1 | * | 10/2001 | Waffenschmidt ............. | 324/202 |
| 6,304,079 B1 | * | 10/2001 | Kenjo et al. ........... | 324/207.21 |
| 6,496,784 B1 | * | 12/2002 | Dukart et al. .................. | 702/94 |

FOREIGN PATENT DOCUMENTS

DE 19852502 A 5/2000 ............ G01B/7/30

* cited by examiner

*Primary Examiner*—Edward Lefkowitz
*Assistant Examiner*—Reena Aurora
(74) *Attorney, Agent, or Firm*—Aaron Waxler

(57) ABSTRACT

The present invention relates to an angle sensor and a method for adjustment of an angle sensor.

Figure 1:
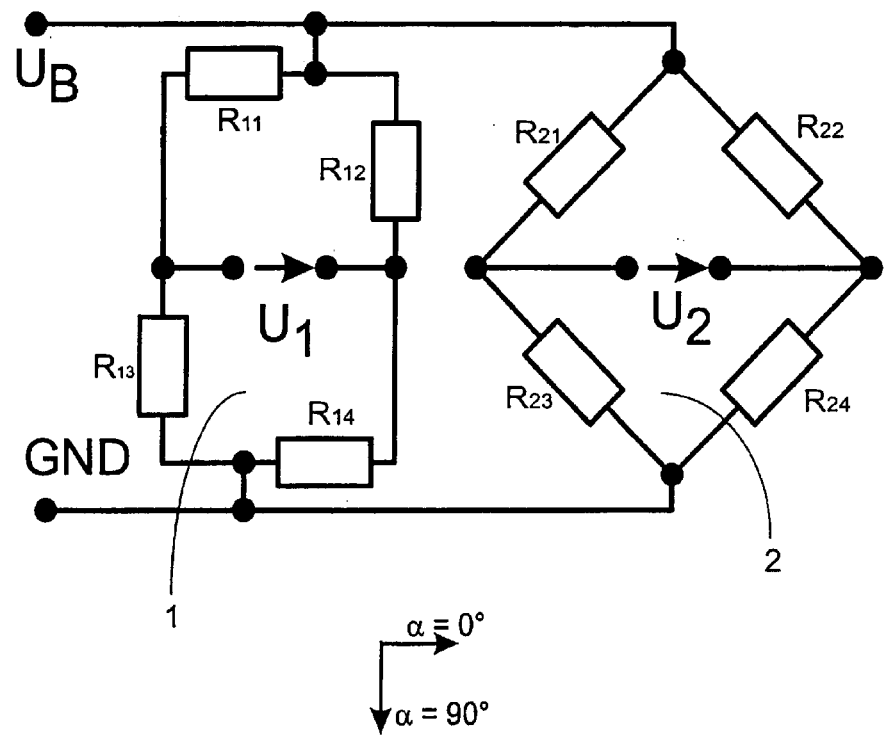

The angle sensor has two bridge circuits (1, 2), at which a pair of voltage values ($U_1$, $U_2$) is measurable during an angle measurement. The pair of voltage values are used together with at least one correction value for the computation of an angle.

The angle sensor also has an analysis circuit that is provided for the computation of the correction value from several of the pairs of voltage values ($U_1$, $U_2$). The pairs of voltage values lie on the periphery of a circle or an ellipse when respectively plotted against each other, and the correction value is derived from a center point computation of the circle of the ellipse.

5 Claims, 4 Drawing Sheets

ADJUSTMENT OF A MAGNETO-RESISTIVE ANGLE SENSOR

The present invention relates to an angle sensor and a method for adjustment of an angle sensor.

Today, the use of magneto-resistive angle sensors (MR sensors) is the state of the art. They are used to determine positions in devices which perform rotary movements, e.g. how far a valve is opened. The operation is based on magnetic field changes, i.e. the magnetic field around the sensor changes or the sensor is moved in an existing magnetic field, e.g. the earth's magnetic field. In this case a magneto-resistive angle sensor acts as a compass. The operation of such a magneto-resistive angle sensor is based on electrical components which change their electrical resistance as a function of the magnetic field applied. These components are usually fitted in a bridge circuit (Wheatstone bridge), of which an MR sensor contains two. The voltages decreasing across such bridge circuits serve as parameters for the angle to be measured. As the components are, however, subject to fluctuations in production, even in rest state i.e. at an angle of 0°, a voltage can decrease across the bridge circuits. This "offset" voltage must be compensated before the angle sensor is put into operation, else the angle values shown will be incorrect.

One possibility for achieving such compensation is known from U.S. Pat. No. 6,173,501. The magneto-resistive components therein are surrounded by coils through which current flows and which compensate for any extra magnetic field occurring. An additional measurement is performed before the angle measurement. If voltages then occur at the bridge circuits with the magneto-resistive components, a current is passed through the coils to generate a magnetic field in the coils, which field compensates for the additional external magnetic field applied. The voltages at the bridge circuits thus return to zero and the actual angle measurement can begin. This process has the disadvantage, however, that to compensate for external magnetic fields, the currents through the compensation coils must always be regulated out again, which is not particularly quick and requires the supply of corresponding compensation currents.

Another possibility of compensation is disclosed in DE 198 52 502 A1. Here again two Wheatstone bridges with magneto-resistive components are used. In compensation for any offset voltages, in a first step one Wheatstone bridge is exposed to a equimagnetic field. The starting voltage of the Wheatstone bridge is dependent on the angle at which the equimagnetic field acts on the Wheatstone bridge. The resistance of the individual magneto-resistive resistors of the Wheatstone bridge is then lowest when the equimagnetic field extends perpendicularly to the magneto-resistive resistors, i.e. perpendicularly to the longitudinal axis and perpendicularly to the direction of current flow of the magneto-resistive resistors. If the equimagnetic field extends perpendicularly to the magneto-resistive resistors of the first pair or perpendicularly to the magneto-resistive resistors of the second pair of Wheatstone bridges, the amount of output voltage of the Wheatstone bridge is a maximum. Thus the equimagnetic field applied to the Wheatstone bridge in the first step must be aligned so that it extends neither essentially perpendicularly to the magneto-resistive resistors of the first pair nor essentially perpendicularly to the magneto-resistive resistors of the second pair of Wheatstone bridges. This means that the maximum ranges of the output voltage of the Wheatstone bridge are to be avoided. If the equimagnetic field applied to the Wheatstone bridge is removed in the second step, the output voltages of the Wheatstone bridge depend on the angle at which the equimagnetic field acts on the Wheatstone bridge. This approach to a solution is based on the finding that the output voltage in the second step, i.e. after removing the equimagnetic field, deviates only very slightly from the offset voltage of the Wheatstone bridge over relatively large ranges of the angle of the equimagnetic field active in the first step. Therefore, it is possible to determine the offset voltage of the Wheatstone bridge from the starting voltage after removal of the equimagnetic field. It is only when the equimagnetic field applied to the Wheatstone bridge in the first step extends, perpendicularly to the magneto-resistive resistors of the first pair or perpendicularly to the magneto-resistive resistors of the second pair after the removal of the equimagnetic field that major deviations of the measured output voltage to the offset voltage occur. The same process for compensation is performed for the second Wheatstone bridge.

The output voltage supplied by the Wheatstone bridge after removal of the equimagnetic field thus constitutes a measurement of the offset voltage of the Wheatstone bridge. The output signal delivered by the Wheatstone bridge in the absence of the equimagnetic field is, therefore, used in the third step for offset calibration by means of the analysis circuit.

Both solutions, however, have the disadvantage that compensation must take place before the actual angle measurement process. Compensation of angles measured before the compensation is not possible.

The object of the present invention is therefore to allow an adjustment of an MR sensor which can be performed also during operation of the angle sensor.

The object is achieved according to the invention by means of an angle sensor that has two bridge circuits (1, 2), at which a pair of voltage values ($U_1$, $U_2$) is measurable during an angle measurement, which pair of voltage values is used together with at least one correction value for the computation of an angle, and that has an analysis circuit that is provided for the computation of the correction value from several of the pairs of voltage values ($U_1$, $U_2$), which pairs of voltage values lie on the periphery of a circle or an ellipse when respectively plotted against each other, and which correction value is derived from a center point computation of the circle or the ellipse.

This allows measurement voltages already measured and angles calculated therefrom to be corrected afterwards if an offset voltage has been present. This can take place for every angle measurement or at regular intervals. The correction value which adjusts the angle sensor can be applied directly to the measurement values of the measurement voltages in the analysis circuit. The output signal thus always contains the corrected, adjusted angle. Moreover, the correction takes place directly in the signal processing of the analysis circuit without requiring additional correction devices, such as correction coils, as used in the state of the art.

The adjustment made, via the correction value, with the measurement operation in progress offers the advantage that each angle measured in detected correctly. This is particularly advantageous when absolutely precise measurements are necessary or the external conditions around the sensor change constantly, e.g. due to changing external magnetic fields or temperatures. Under such conditions, correct angle determination can be ensured only by permanent adjustment of the MR sensor.

Providing the angle sensor of the present invention with bridge circuits (1, 2) having magneto-resistive components ($R_{11}$, $R_{12}$, $R_{13}$, $R_{14}$, $R_{21}$, $R_{22}$, $R_{23}$, $R_{24}$) and being arranged to be rotated against each other by an angle of 45° offers the advantage that the pair of voltage values measured across the two bridge circuits of an MR sensor are phase-offset precisely by an angle of 45°. Thus, the zero crossing of one voltage always coincides with the maximum of the other voltage, and the measured pair of voltage values can be represented by a point on the periphery of a circle or ellipse when the voltage values are plotted against each other. This arrangement also provides clearly unambiguously allocatable pairs of voltage values for angles in the range of 0° to 180°.

When use is made of a microprocessor in the analysis circuit as claimed in claim 4, the process of adjusting the angle sensor can be realized by using a program which performs the circle calculation. This increases the flexibility should improvement be desired. The microprocessor can also apply the correction values determined directly to the measured pairs of voltage values so that continuous adjustment of the angle sensor is ensured and the angle output is always correct.

In conformity with claim 5, the present angle sensor offers the advantage that for correct adjustment of this sensor measured values in a small angle range suffice to perform a sufficiently precise adjustment. This is important as the adjustment should be possible during operation. The angle sensor must be adjustable as accurately as possible for any angle measured. The smaller the measured angle, the less precise the adjustment. To this extent, it is a great advantage that an angle of 10° is sufficient for the angle sensor according to the invention.

One of the embodiment as claimed offers a sufficiently precise calculation of the correction values, and requires only a relatively small calculation effort. This yields an optimum compromise between accuracy and calculation effort or the hardware required for that purpose.

Figure 2:
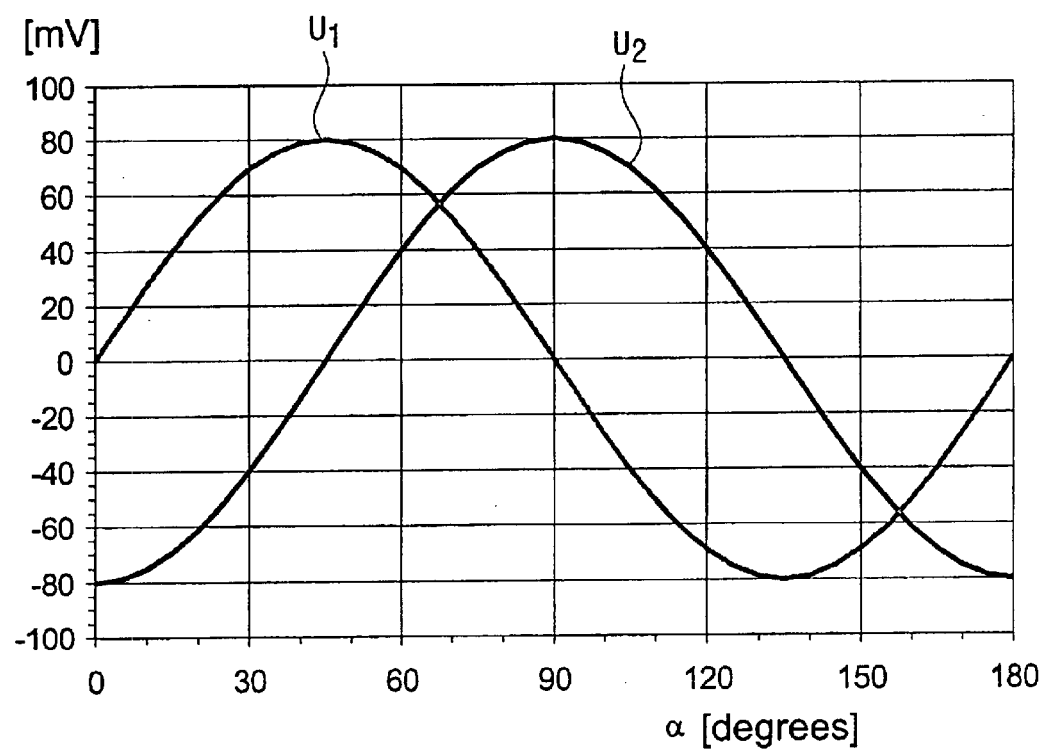
Figure 3:
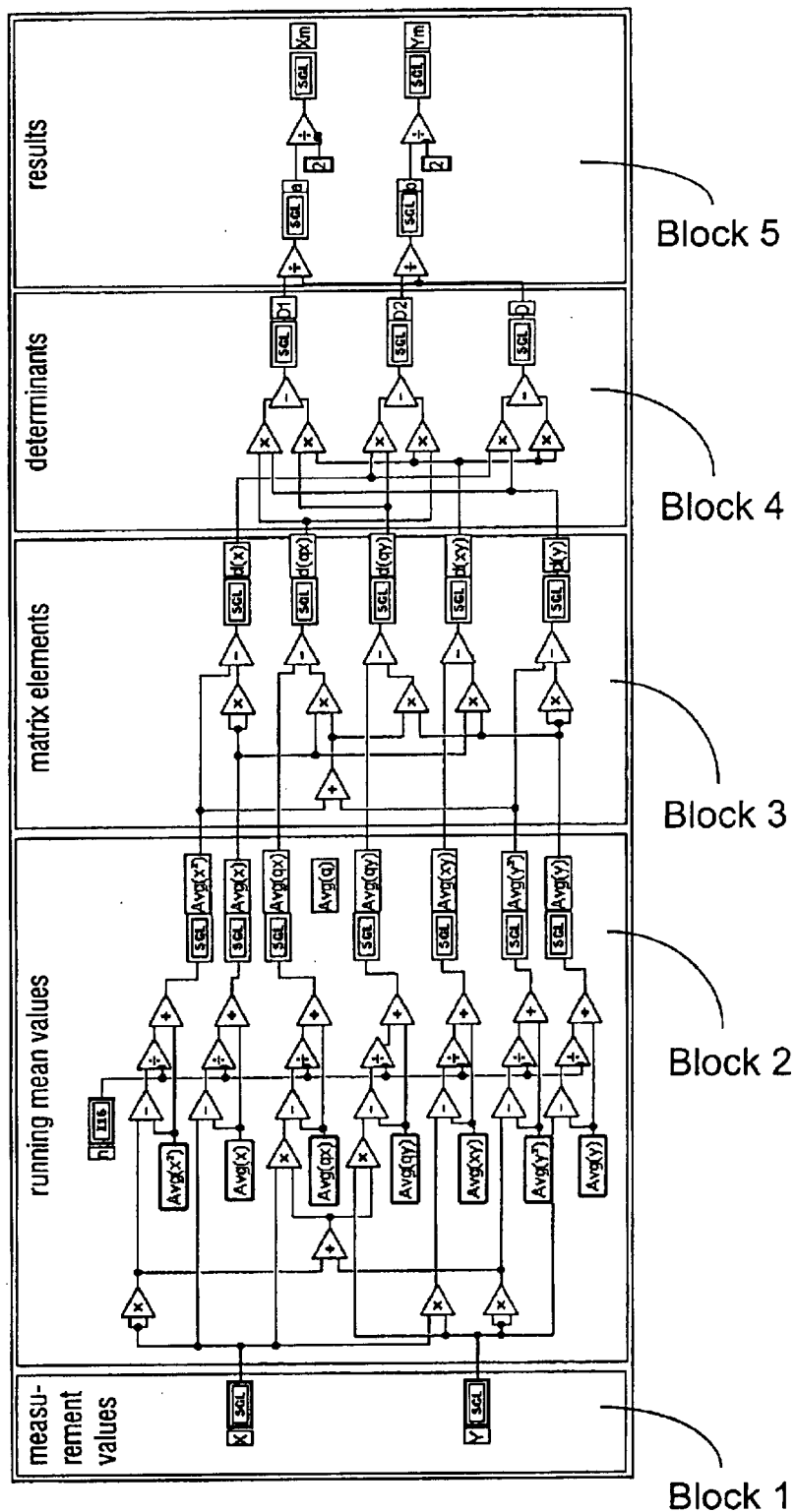
Figure 4:
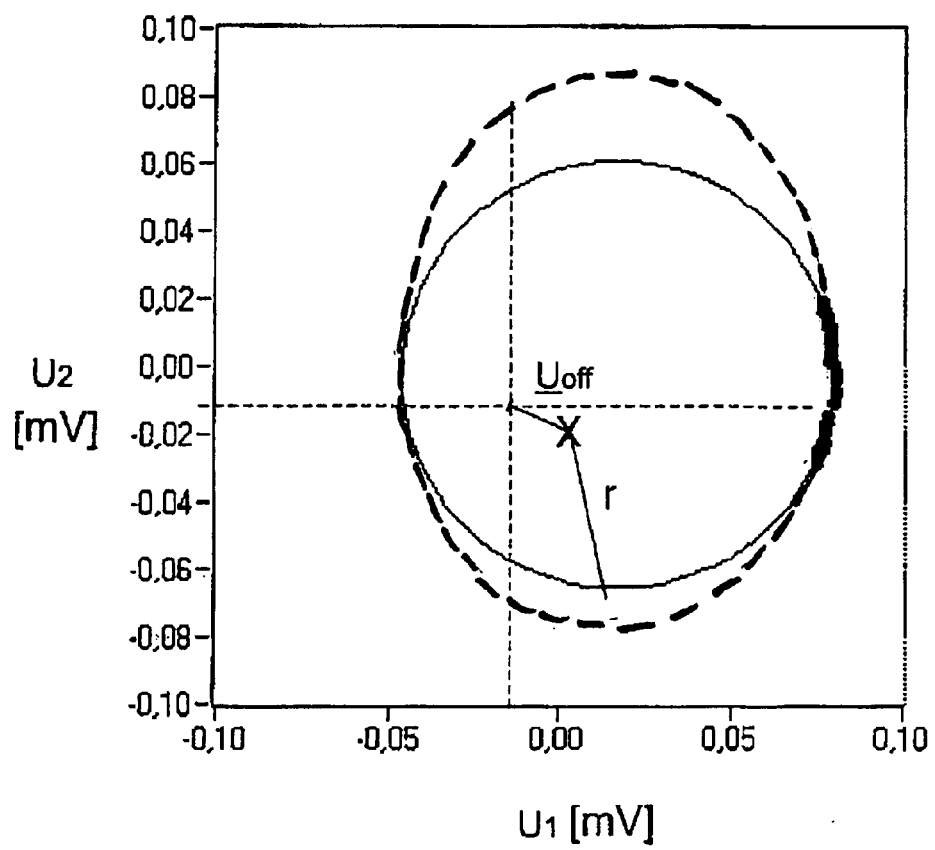

Embodiments of the invention will be described in detail hereinafter with reference to several Figures. Therein:

FIG. 1 shows a double bridge circuit of two Wheatstone bridges arranged offset to each other by 45°, FIG. 2 shows the variations of the bridge voltages $U_1, U_2$ over a mechanical angle range of 180°, FIG. 3 shows the fit algorithm according to the invention as a LabView diagram, and FIG. 4 shows the result of a circle calculated with the fit algorithm and the resultant offset voltage $\underline{U}_{off}$.

A magneto-resistive angle sensor (MR sensor) as shown in FIG. 1 consists of two Wheatstone bridge circuits 1, 2. A Wheatstone bridge circuit in conjunction with magneto-resistive sensors is also known from DE 34 42 278. Both Wheatstone bridges are supplied from a common direct current voltage source. The magnetically influenceable resistors of the two bridges $R_{11}, R_{12}, R_{13}, R_{14}$ and $R_{21}, R_{22}, R_{23}, R_{24}$ change their electrical resistance as a function of the ambient magnetic field. A bridge voltage $U_1, U_2$ drops off across each of the two bridges 1, 2. The voltages $U_1, U_2$ are at the same time the two output signals of the MR sensor and are required for angle calculation which takes place in an analysis circuit of the MR sensor (not shown here). One bridge 2 is also arranged so as to be offset by 45° relative to the other bridge. If the MR sensor consisting of the two bridges 1, 2 is not moved, or if the magnetic field surrounding the MR sensor does not change, the two voltages $U_1, U_2$ do not change.

The 45° arrangement ensures that the output voltages $U_1, U_2$ of the two bridges 1, 2 as in FIG. 2 are phase-offset by 45°. If the two voltages $U_1, U_2$ are applied over a (mechanical) rotation angle range of 180°, as we see from FIG. 2, each angle between 0° and 180° is clearly characterized by a pair of voltage values $U_1, U_2$. This means that the bridge circuit can unambiguously represent a rotary movement of the MR sensor in the range from 0° to 180°. As the maximum amplitudes of the voltages $U_1, U_2$ are equally large, the angle range from 0° to 180° can be projected onto a circle with the center in the origin in one plane, an electrical rotation by 360° thus corresponding to a mechanical rotation of the sensor by 180°.

Due to external influences or component tolerances however, it often occurs that the measurement voltages $U_1, U_2$ are overlaid by an offset voltage $\underline{U}_{off}$. This offset voltage $\underline{U}_{off}$ causes that the center of the circle moves away from the origin. In order to detect an angle correctly, this offset voltage $\underline{U}_{off}$ must be known. To this end, the pairs of voltage values $U_1, U_2$ of several angle measurement points are determined and the center is calculated of a circle on whose periphery these angle measurement points lie. The distance of the circle center from the origin then gives the offset voltage $\underline{U}_{off}$. This offset voltage is then deducted by the analysis circuit from the measurement voltages or their corresponding measurement values stored as binary figures, so that the non-falsified angle can be output by the analysis circuit as an output signal.

The sections below describe two processes for determining the center and the radius of a circle. It is assumed that x and y are the measurement values of the output voltages $U_1, U_2$ of a measurement point of the MR sensor (magneto-resistive sensor), all of which lie on a circle with an unknown center ($X_m$ and $y_m$) and a radius r.

The calculation with just three measurement points takes place using the following method. This method can already be very helpful for "offline" trimming of the sensor, i.e. an adjustment of the measurement voltages $U_1, U_2$ before the first angle calculation which is also passed onto an output device.

The general equation for a circle is given:

$$(x-x_m)^2+(y-y_m)^2=r^2. \tag{1}$$

By multiplying out the brackets we have $$x^2-2x_mx+x_m^2+y^2-2y_my+y_m^2=r^2. \tag{2}$$

This equation can be converted into $$2x_mx+2y_my+r^2-x_m^2-y_m^2=x^2+y^2 \tag{3}$$

We introduce:

$$a = 2x_m \left(\text{and hence } x_m = \frac{a}{2}\right) \tag{4}$$

$$b = 2y_m \left(\text{and hence } y_m = \frac{b}{2}\right) \tag{5}$$

$$c = r^2 - x_m^2 - y_m^2 \left(\text{and hence } r = \sqrt{c + x_m^2 + y_m^2}\right) \tag{6}$$

$$q=x^2+y^2 (\text{and hence } q_i=x_i^2+y_i^2) \tag{7}$$

Thus equation (3) becomes $$ax+by+c=q \tag{8}$$

If the three points $P_1=(x_1,y_1), P_2=(x_2,y_2), P_3=(x_3,y_3)$ are known, the following equation system is obtained:

$$ax_1+by_1+c=q_1$$

$$ax_2+by_2+c=q_2$$

$$ax_3+by_3+c=q_3 \tag{9}$$

As matrix equation we have:

$$\begin{vmatrix} x_1 & y_1 & 1 \\ x_2 & y_2 & 1 \\ x_3 & y_3 & 1 \end{vmatrix} \cdot \begin{vmatrix} a \\ b \\ c \end{vmatrix} = \begin{vmatrix} q_1 \\ q_2 \\ q_3 \end{vmatrix} \quad (10)$$

This equation can be solved by a,b,c:

$$\begin{vmatrix} a \\ b \\ c \end{vmatrix} = \text{Inv} \begin{vmatrix} x_1 & y_1 & 1 \\ x_2 & y_2 & 1 \\ x_3 & y_3 & 1 \end{vmatrix} \cdot \begin{vmatrix} q_1 \\ q_2 \\ q_3 \end{vmatrix} \quad (11)$$

$x_m$, $y_m$ and r are easy to calculate according to equations (4),(5),(6).

For a fit (circle calculation) with more than three measurement points, a different method must be chosen. Such a process is described below and is known as a fit algorithm. This fit algorithm is executed as a program on a microprocessor in the analysis circuit of the angle sensor.

If more than three points are known, the equation system is over-determined. For n points, the system in matrix format is:

$$\begin{vmatrix} 1 & x_1 & y_1 \\ 1 & x_2 & y_2 \\ 1 & x_3 & y_3 \\ \vdots & \vdots & \vdots \\ 1 & x_n & y_n \end{vmatrix} \cdot \begin{vmatrix} c \\ a \\ b \end{vmatrix} = \begin{vmatrix} q_1 \\ q_2 \\ q \\ \vdots \\ q_n \end{vmatrix} \quad (12)$$

To solve the problem according to the least-squares method, a generally known solution method is applied to the present problem. To this end, a matrix A is defined:

$$A = \begin{vmatrix} 1 & x_1 & y_1 & q_1 \\ 1 & x_2 & y_2 & q_2 \\ 1 & x_3 & y_3 & q_3 \\ \vdots & \vdots & \vdots & \vdots \\ 1 & x_n & y_n & q_n \end{vmatrix} \quad (13)$$

From this matrix the "matrix square" $A^2$ is calculated:

$$A^2 = A^T \cdot A \quad (14)$$

This gives for $A^2$:

$$A^2 = \begin{vmatrix} n & \sum_{}^{n} x & \sum_{}^{n} y & \sum_{}^{n} q \\ \sum_{}^{n} x & \sum_{}^{n} x^2 & \sum_{}^{n} xy & \sum_{}^{n} qx \\ \sum_{}^{n} y & \sum_{}^{n} xy & \sum_{}^{n} y^2 & \sum_{}^{n} qy \end{vmatrix} \quad (15)$$

To obtain an equation system for solving, the matrix is split up as follows:

$$\begin{vmatrix} n & \sum_{}^{n} x & \sum_{}^{n} y \\ \sum_{}^{n} x & \sum_{}^{n} x^2 & \sum_{}^{n} xy \\ \sum_{}^{n} y & \sum_{}^{n} xy & \sum_{}^{n} y^2 \end{vmatrix} \cdot \begin{vmatrix} c \\ a \\ b \end{vmatrix} = \begin{vmatrix} \sum_{}^{n} q \\ \sum_{}^{n} qx \\ \sum_{}^{n} qy \end{vmatrix} \quad (16)$$

For simplification, the equation system is divided by n and some abbreviations are introduced:

$$\bar{x} = \frac{\sum_{}^{n} x}{n} \quad (\bar{x} = \text{mean value of } x_i) \quad (17)$$

$$\bar{y} = \frac{\sum_{}^{n} y}{n} \quad (\bar{y} = \text{mean value of } y_i) \quad (18)$$

$$\overline{x^2} = \frac{\sum_{}^{n} x^2}{n} \quad (\overline{x^2} = \text{mean value of } x_i^2) \quad (19)$$

$$\overline{y^2} = \frac{\sum_{}^{n} y^2}{n} \quad (\overline{y^2} = \text{mean value of } y_i^2) \quad (20)$$

$$\overline{xy} = \frac{\sum_{}^{n} xy}{n} \quad (\overline{xy} = \text{mean value of } x_i y_i) \quad (21)$$

$$\bar{q} = \frac{\sum_{}^{n} q}{n} \quad (\bar{q} = \text{mean value of } q_i) \quad (22)$$

$$\overline{qx} = \frac{\sum_{}^{n} qx}{n} \quad (\overline{qx} = \text{mean value of } q_i x_i) \quad (23)$$

$$\overline{qy} = \frac{\sum_{}^{n} qy}{n} \quad (\overline{qy} = \text{mean value of } q_i y_i) \quad (24)$$

This gives the equation system:

$$\begin{vmatrix} 1 & \bar{x} & \bar{y} \\ \bar{x} & \overline{x^2} & \overline{xy} \\ \bar{y} & \overline{xy} & \overline{y^2} \end{vmatrix} \cdot \begin{vmatrix} c \\ a \\ b \end{vmatrix} = \begin{vmatrix} \bar{q} \\ \overline{qx} \\ \overline{qy} \end{vmatrix} \quad (25)$$

This need now only be solved by a, b and c to obtain the solution to the problem:

$$\begin{bmatrix} c \\ a \\ b \end{bmatrix} = \text{Inv} \begin{bmatrix} 1 & \bar{x} & \bar{y} \\ \bar{x} & \overline{x^2} & \overline{xy} \\ \bar{y} & \overline{xy} & \overline{y^2} \end{bmatrix} \cdot \begin{bmatrix} \bar{q} \\ \overline{qx} \\ \overline{qy} \end{bmatrix} \quad (26)$$

$x_m$, $y_m$ and r are easy to calculate according to equations (4),(5),(6).

The equation system can be solved in many known ways, e.g. using the known Gauss method. There are also microchip algorithms for calculating inverse ternary matrices which are used in particular in digital image processing. Naturally the solution can also be calculated out explicitly, which will be given as a solution approach hereinafter. As it is not necessary to determine the radius r or the constant c for use in the MR sensor, the equation system is first reduced, using the Gauss method, to two equations:

$$\begin{vmatrix} \overline{x^2} - \overline{x}^2 & \overline{xy} - \overline{x} \cdot \overline{y} \\ \overline{xy} - \overline{x} \cdot \overline{y} & \overline{y^2} - \overline{y}^2 \end{vmatrix} \cdot \begin{vmatrix} a \\ b \end{vmatrix} = \begin{vmatrix} \overline{qx} - \overline{q} \cdot \overline{x} \\ \overline{qy} - \overline{q} \cdot \overline{y} \end{vmatrix} \quad (27)$$

Intermediate variables are introduced:

$$d_x = \overline{x^2} - \overline{x}^2 \quad (28)$$

$$d_y = \overline{y^2} - \overline{y}^2 \quad (29)$$

$$d_{xy} = \overline{xy} - \overline{x} \cdot \overline{y} \quad (30)$$

$$d_{qx} = \overline{qx} - \overline{q} \cdot \overline{x} \quad (31)$$

$$d_{qy} = \overline{qy} - \overline{q} \cdot \overline{y} \quad (32)$$

so that for the equation system we have:

$$\begin{vmatrix} d_x & d_{xy} \\ d_{xy} & d_y \end{vmatrix} \cdot \begin{vmatrix} a \\ b \end{vmatrix} = \begin{vmatrix} d_{qx} \\ d_{qy} \end{vmatrix} \quad (33)$$

This equation system can now be solved in conformity with the Cramer rule using the main determinant D and secondary determinants $D_1$ and $D_2$. The following applies:

$$D = d_x \cdot d_y - d_{xy}^2 \quad (34)$$

$$D_1 = d_{qx} \cdot d_y - d_{qy} \cdot d_{xy} \quad (35)$$

$$D_2 = d_{qy} \cdot d_x - d_{qx} \cdot d_{xy} \quad (36)$$

with $$a = \frac{D_1}{D} \quad (37)$$

$$b = \frac{D_2}{D} \quad (38)$$

or taking into account the equations (4),(5)

$$x_m = \frac{D_1}{2D} \quad (39)$$

$$y_m = \frac{D_2}{2D} \quad (40)$$

Thus, the desired values of the offset $\underline{U}_{off}$ are known. FIG. 3 shows the implementation of the algorithm with a data flow machine, that is, in this case as an example with the program LabView. Essentially the current mean values of the measurement values are formed and also the current mean values of the values $x^2$, $y^2$, $x*y$ and $x*q$ and $y*q$ derived therefrom. The offset voltages are then calculated as co-ordinates of the circle center from these current mean values formed. The conversion is selected to be such that division takes place only at the very end, while all other operations are additions, subtractions and multiplications.

The input parameters for the fit algorithm, for n-times measurement, thus are the measurement values shown on the left in block 1 in FIG. 3, $(x_1, \ldots, x_n)$ for one bridge 1 and $(y_1, \ldots, y_n)$ for the other bridge 2 by means of which an over-determined system of circle equations is produced as stated above in the equation (12). In the second block, from the measurement values $(x_1, \ldots, x_n)$ and $(y_1, \ldots, y_n)$ there are formed the relevant mean values of x, y, $x^2$, $y^2$, $x*y, q*y, q*x$ which, in the third block, are used as matrix elements of a new matrix as in the equation (25). In block 4 the determinants of the new matrix are according to calculated to the equation (25), that is, the main determinant D and the two secondary determinants $D_1$ and $D_2$ according to the equations (34), (35) and (36). The offset values $x_m$ and $y_m$ of the offset voltage $\underline{U}_{off}$ then arise in block 5 as a result of the division of the secondary determinants $D_1$ and $D_2$ by the main determinant D multiplied by 2. The functions according to FIG. 3 can be implemented both by means of hardware and by means of software.

If the maximum amplitudes of the bridge voltages $U_1$ and $U_2$ are unequal, an ellipse is formed rather than a circle. In the case of a known amplitude difference, the ellipse can be scaled in one direction to map the ellipse on a circle. In the case of an unknown amplitude difference, an equivalent method for determining the ellipse center can be used, starting from the ellipse equation $$x^2 + \epsilon^2 y^2 = r^2, \quad (41)$$

where $\epsilon$ is the asymmetry value (for $\epsilon = 1$ the circle equation results).

The possible precision of the said process is shown in FIG. 4. This figure shows the result of a circle adapted to the preset measurement values in an angle range of 45°. A good result is achieved.

The process has the unique advantage over the others that individual measurement values which are "favorably situated" immediately increase the precision of the result extremely. 16 or 256 measurement values with different noise amplitudes are generated in the angle range of 20°. Then a single further measurement value which has a larger angle distance is added to these values. It is found that this single value improves the result as much as if all measurement values were distributed evenly over the new, larger angle range.

Measurements on a real MR sensor, such as the MR sensor KMZ-41 by Philips, show a suitable correspondence with the simulated data. The process is suitably implemented as software which runs on a microprocessor which can itself be part of the analysis circuit of the MR sensor.

What is claimed is:

1. An angle sensor comprising:
   two bridge circuits at which a pair of voltage values ($U_1$, $U_2$) is measurable during an angle measurement, which pair of voltage values is used together with at least one correction value for the computation of an angle, and
   an analysis circuit for computing the at least one correction value from several of the pairs of voltage values ($U_1$, $U_2$), which pairs of voltage values lie on the periphery of a circle or an ellipse when respectively plotted against each other, and which at least one correction value is derived from a center point computation of the circle or the ellipse, wherein the pairs of voltage values ($U_1$, $U_2$) used for the computation of the correction value lie in a mechanical angle range of 10° on the periphery of the circle or ellipse; and wherein a corrective adjustment to the angle sensor by the correction value occurs during said angle measurement by said angle sensor.

2. The angle sensor of claim 1, wherein the bridge circuits have magneto-resistive components ($R_{11}$, $R_{12}$, $R_{13}$, $R_{14}$, $R_{21}$, $R_{22}$, $R_{23}$, $R_{24}$) and that the bridge circuits are arranged so as to be rotated against each other by an angle of 45°.

3. The angle sensor of claim 2, wherein the microprocessor processes 16-bit floating point numbers.

4. The angle sensor of claim 1, wherein the analysis circuit of the angle sensor includes a microprocessor for computing the center coordinates of the circle or the ellipse as correction values and for computing the angle by means of the correction values.

5. A method of adjusting an angle sensor, comprising the steps of:

measuring a pair of voltage values ($U_1$, $U_2$) at two bridge circuits during an angle measurement; and computing an angle using the pair of voltage values and at least one correction value, determining the correction value from several of the pairs of voltage values ($U_1$, $U_2$), which values lie on the periphery of a circle or an ellipse when respectively plotted against each other, using a center-point computation of the circle or tie ellipse, wherein the pairs of voltage values ($U_1$, $U_2$) used for the computation of the correction value lie in a mechanics angle range of 10° on the periphery of the circle or ellipse; and including the step of making a corrective adjustment to the angle sensor by the correction value during said angle measurement by said angle sensor.

\* \* \* \* \*